J. H. Stimpson,
Butter Dish.
Nº 12,876.   Patented May 15, 1855.
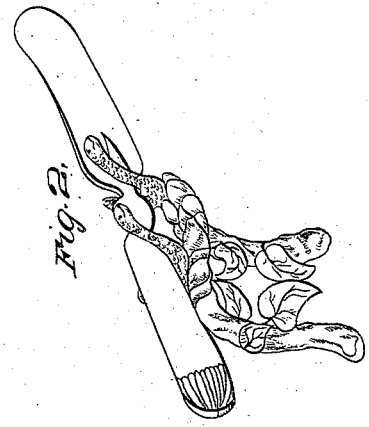
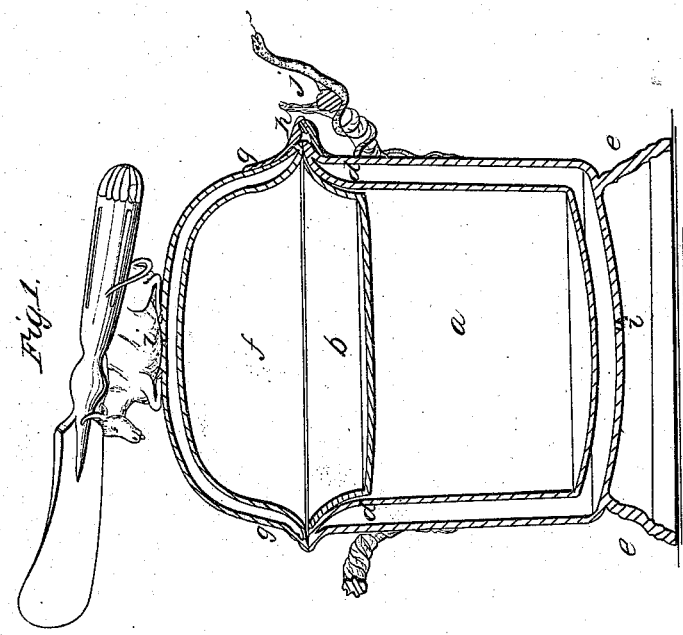

UNITED STATES PATENT OFFICE.

JAMES H. STIMPSON, OF BALTIMORE, MARYLAND.

BUTTER-COOLER.

Specification of Letters Patent No. 12,876, dated May 15, 1855.

*To all whom it may concern:*

Be it known that I, JAMES H. STIMPSON, of Baltimore and State of Maryland, have invented an Improvement in the Article Usually Called a Butter-Dish, which improvement I denominate a "butter-cooler," and that the following is a full, clear, and exact description of the principle or character which distinguishes it from all other things before known and of the usual manner of making, modifying, and using the same, reference being had to the accompanying drawings, of which—

Figure 1 is a vertical middle section. Fig. 2 a detached view of the handle supporting the butter knife.

The nature of my invention consists in providing a chamber or reservoir for the ice, with a diaphragm over the ice on which diaphragm the butter rests; and with a lid of suitable depth over the butter; the chamber, diaphragm, butter and lid are then entirely inclosed within a casing in such a way that when the lid is down, they are all kept from contact with the external atmosphere by a stratum of still air and when the lid is up free access can be had to the butter.

To enable those skilled in the art to make and use my invention, I will proceed more particularly to describe its construction and operation.

The ice chamber $a$ Fig. 1 is secured all around its upper edges to the top of the casing $d$, which casing rests on the rim or feet $e$.

The hollow lid $f$, is secured at its edges to the casing $g$, which casing is attached to the casing $d$, by the hinge $h$ so that it may be opened and when open to rest on the hinge and on the handle $j$.

The diaphragm $b$ resting by its upper edges on the chamber $a$ is to support the butter, and may be lifted out and cleaned when necessary. Any ornamental knob may be used to open the lid by, the figure of a cow being used in this case, the horns and tail supporting a butter knife. As it is proper for the lid to be closed when butter is not being taken out, and that being the place for the knife, the lid will of course have to be closed before the knife can be put in its place, or the knife may be placed in the branch of the handle $j$ which will answer.

A small vent at $i$ in the lid $f f$, and in the casing $d$ may be made to prevent collapse should the nature of the material require it. Any material preferred may be used in the construction the present being made of Britannia metal, and in it ice will last three times as long as in the usual butter dish.

An important advantage of my butter cooler is, the keeping of the butter effectually cool and hard in hot weather, without putting ice on the butter. In the single wall butter cooler the ice is laid on the butter, and the water from the ice falls into the dish below. This course is objectionable for several reasons. The butter is injured by the water, the ice is not always clean, and the ice is very much in the way, and very apt to be slipped or pushed out of its place. For these difficulties there is no remedy with the single wall butter cooler, for if the ice should be placed in the dish below, it would melt away with great rapidity, and would fail to keep the butter cool and hard. In short, with the double wall the ice may be placed below the diaphragm or butter shelf, with economy and effect, while with the single wall the ice must be placed upon the butter.

What I claim, is—

1. The improved butter cooler the same consists in the double wall cover and reservoir with a diaphragm or shelf between them in the manner and for the purposes set forth.

2. I claim making the support for the butter knife upon the cover or handle one or both, so that the knife cannot be put in place without closing the lid, thereby securing the economy of ice and the hardness of butter.

JAMES H. STIMPSON.

Witnesses:
J. M. COLBURN,
JAMES MCNEAL, Jr.